(12) United States Patent
Huh et al.

(10) Patent No.: US 9,707,848 B2
(45) Date of Patent: Jul. 18, 2017

(54) BRAKING CONTROL METHOD FOR ECO-FRIENDLY VEHICLE

(71) Applicants: Hyundai Motor Company, Seoul (KR); Kia Motors Corporation, Seoul (KR)

(72) Inventors: Jee Wook Huh, Gyeonggi-do (KR); Gwang Il Du, Incheon (KR); Kyoung Cheol Oh, Gyeonggi-do (KR); Teh Hwan Cho, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 37 days.

(21) Appl. No.: 14/855,982

(22) Filed: Sep. 16, 2015

(65) Prior Publication Data
US 2016/0121728 A1    May 5, 2016

(30) Foreign Application Priority Data
Nov. 3, 2014    (KR) .................. 10-2014-0151127

(51) Int. Cl.
G06F 7/70 (2006.01)
G06G 7/00 (2006.01)
B60L 7/26 (2006.01)
B60L 7/18 (2006.01)

(52) U.S. Cl.
CPC .......... *B60L 7/26* (2013.01); *B60L 7/18* (2013.01); *B60L 2240/662* (2013.01); *Y02T 90/16* (2013.01)

(58) Field of Classification Search
CPC combination set(s) only.
See application file for complete search history.

(56) References Cited

FOREIGN PATENT DOCUMENTS

| | | | |
|---|---|---|---|
| JP | H07266912 | A | 10/1995 |
| JP | H09308004 | A | 11/1997 |
| JP | 2003-102108 | A | 4/2003 |
| JP | 2005-014692 | A | 1/2005 |
| JP | 2006-205787 | A | 8/2006 |
| JP | 2008-120220 | A | 5/2008 |
| JP | 2013-106457 | A | 5/2013 |
| JP | 2013-124054 | A | 6/2013 |
| JP | 5368954 | B2 | 12/2013 |
| KR | 2011-0139836 | A | 12/2011 |

(Continued)

*Primary Examiner* — Bhavesh V Amin
(74) *Attorney, Agent, or Firm* — Mintz Levin Cohn Ferris Glovsky and Popeo, P.C.; Peter F. Corless

(57) ABSTRACT

A braking control method of an eco-friendly vehicle includes: determining a total braking amount according to a driver braking input; determining a regenerative braking permissible amount from the total braking amount through distribution of braking power; determining a regenerative braking torque according to the regenerative braking permissible amount; determining a reference regenerative braking execution amount to which a transmission state is reflected from the regenerative braking torque; determining a final regenerative braking execution amount by correcting the reference regenerative braking execution amount according to environmental information; determining a friction braking amount from the total braking amount and the final regenerative braking execution amount; and performing friction braking for controlling a friction braking device based on the friction braking amount.

12 Claims, 7 Drawing Sheets

(56) References Cited

FOREIGN PATENT DOCUMENTS

| | | |
|---|---|---|
| KR | 10-2012-0024001 A | 3/2012 |
| KR | 10-1272515 B1 | 6/2013 |
| KR | 10-1348898 B1 | 1/2014 |

BRAKING CONTROL METHOD FOR ECO-FRIENDLY VEHICLE

CROSS-REFERENCE TO RELATED APPLICATION

This application claims under 35 U.S.C. §119(a) the benefit of Korean Patent Application No. 10-2014-0151127 filed Nov. 3, 2014, the entire contents of which are incorporated herein by reference.

BACKGROUND

Technical Field

The present invention relates to a braking control method and system for an eco-friendly vehicle. More particularly, it relates to a braking control method, a braking control system, and a non-transitory computer readable medium for an eco-friendly vehicle, which can solve a problem of deterioration of braking reliability due to influence of environmental conditions in performance of vehicle braking through distribution of regenerative braking and friction braking, in order to satisfy a driver request braking amount.

Description of the Related Art

Conventional internal-combustion engine vehicles using fossil fuel such as gasoline or diesel have several problems including environmental pollution due to exhaust gas, global warming due to carbon dioxide, occurrence of respiratory diseases due to generation of ozone, and the like.

Accordingly, there have been developed eco-friendly vehicles, such as an electric vehicle (EV) driven by electric power, i.e., utilizing an electric motor, a hybrid electric vehicle (HEV) driven by an internal-combustion engine and an electric motor, and a fuel cell electric vehicle (FCEV) driven by driving an electric motor using electric power generated from a fuel cell.

In an eco-friendly vehicle, a regenerative mode is performed in which braking or inertia energy in braking of the vehicle or coasting by inertia is collected through generation of electric power using an electric motor and then charged in a battery (motor charge).

As such, in the braking or coasting of the eco-friendly vehicle, energy is collected using the electric motor, and the battery is charged with the collected energy. Thus, the energy can be efficiently used, and the fuel efficiency of the vehicle can be improved.

Particularly, a regenerative braking system of the eco-friendly vehicle converts kinetic energy of the vehicle into electric energy in braking of the vehicle, and stores the converted energy in the battery. Then, the regenerative braking system enables the stored energy to be reused in driving the electric motor, thereby improving the fuel efficiency of the vehicle.

Such a regenerative braking technology is a core technology of an eco-friendly vehicle, in which, in order to maximize fuel efficiency, electric energy is generated by applying a reverse torque to an electric motor using energy generated during braking, and the generated electric energy is stored in a battery, thereby enabling reuse of the stored electric energy in driving of the vehicle. The regenerative braking technology is applied to most eco-friendly vehicles.

Meanwhile, a vehicle controller (hybrid control unit (HCU)/vehicle control unit (VCU)), as an uppermost-level controller for controlling all operations of the eco-friendly vehicle, is mounted in the vehicle. In addition, the eco-friendly vehicle is provided with a variety of controllers for controlling various devices of the vehicle.

For example, the eco-friendly vehicle is provided with a brake controller for controlling the operation of a friction brake (friction braking device), a motor controller (motor control unit (MCU)) for controlling the operation of a motor, a transmission controller (transmission control unit (TCU)) for controlling the operation of a transmission, a battery controller (battery management system (BMS)) for collecting information on states of a battery to use the collected information in battery charging/discharging control or to provide the collected information to the other controllers, and the like.

The vehicle controller and each controller perform cooperation control while communicating information with each other through controller area network (CAN) communication. In this state, an upper-level controller transmits control commands to the lower-level controllers while receiving and collecting various information transmitted from the lower-level controllers.

Main functions of controllers related to regenerative braking in an eco-friendly vehicle will be briefly described with reference to FIG. 1 (RELATED ART). The regenerative braking is basically performed through cooperation control of a brake controller 10 for performing friction braking (hydraulic braking), a vehicle controller 20 for determining a regenerative braking execution amount and a regenerative braking motor torque command, a motor controller 30 for performing regenerative braking by controlling the torque of a motor according to the motor torque command, a battery controller (not shown) for providing information on a state of a battery, and a transmission controller (not shown) for providing information on a state of a transmission.

The brake controller 10 determines a request braking amount according to a driver's brake pedal input, i.e., a total braking amount. The brake controller 10 determines a regenerative braking permissible amount through distribution of braking power and transmits the determined regenerative braking permissible amount to the vehicle controller 20.

Accordingly, the vehicle controller 20 determines a motor torque command according to the regenerative braking permissible amount, and transmits the determined motor torque command to the motor controller 30.

Also, the vehicle controller 20 determines a regenerative braking execution amount in consideration of states of the motor and the transmission, and transmits the determined regenerative braking execution amount to the brake controller 10.

The motor controller 30 controls the torque of the motor through an inverter according to the motor torque command (regenerative braking command) received from the vehicle controller 20, and transmits information on a motor output torque, etc. so that the vehicle controller 20 can estimate the regenerative braking execution amount.

The brake controller 10 controls friction braking satisfying the total braking amount with reference to the regenerative braking execution amount received from the vehicle controller 20.

In particular, the brake controller 10 determines a friction braking amount (hydraulic braking amount) obtained by subtracting the regenerative braking execution amount from the total braking amount, and then controls the operation of a friction braking device (hydraulic braking device) to generate braking power corresponding to the friction braking amount (performance of friction braking).

The transmission controller performs control on a vehicle transmission such as an automatic transmission (AT) or a dual clutch transmission (DCT), and transmits information on a transmission state (transmission gear ratio), etc. to the vehicle controller 20 so that the vehicle controller 20 can determine the regenerative braking execution amount.

As such, in the conventional eco-friendly vehicle, the brake controller 10 calculates a regenerative braking permissible amount, the vehicle controller 20 calculates a motor torque command according to the regenerative braking permissible amount, and the motor controller 30 controls the motor according to the motor torque command (performance of regenerative braking).

The vehicle controller 20 calculates a regenerative braking execution amount using information on states of the motor and the transmission and then transmits the calculated regenerative braking execution amount to the brake controller 10. The brake controller 10 performs distribution of braking power using the regenerative braking execution amount and then controls the friction braking device to generate the distributed friction braking power (performance of friction braking).

FIGS. 2 and 3 (RELATED ART) are flowcharts illustrating in detail a braking control process of an eco-friendly vehicle. If a driver manipulates the brake pedal 1, the brake controller 10 determines a total braking amount (S11) according to a pedal stroke (pedal manipulation depth) sensed by a sensor (brake pedal stroke sensor: BPS) (S11), and determines a regenerative braking permissible amount through distribution of braking power (S12 and S13).

The regenerative braking permissible amount is transmitted to the vehicle controller 20. The vehicle controller 20 determines a regenerative braking possible amount according to vehicle conditions (S14) and then determines a regenerative braking torque from the regenerative braking possible amount, using information on the maximum charging power as information on a state of the battery, received in the battery controller 40, and information on the maximum charging torque as information on a state of the motor, received in the motor controller 30 (S15). The vehicle controller 20 determines a motor torque command from the regenerative braking torque (S16) and transmits the determined motor torque command to the motor controller 30.

Accordingly, the motor controller 30 controls the torque of the motor through the inverter according to the motor torque command received from the vehicle controller 20 (S17), thereby performing regenerative braking (S18).

In addition to the performance of the regenerative braking, friction braking is controlled by the brake controller 10. First, the vehicle controller 20 calculates a regenerative braking execution amount according to a change of speed, using information on a state of the transmission, received in the transmission controller 50, from the regenerative braking torque (S19, S20 and S21).

If the regenerative braking execution amount is determined (S23), the vehicle controller 20 transmits the regenerative braking execution amount to the brake controller 10. The brake controller 10 receives the regenerative braking execution amount from the vehicle controller 20 (S24), and determines a friction braking amount obtained by subtracting the regenerative braking execution amount from the total braking amount (S25).

As a result, the brake controller 10 controls the friction braking device to generate braking power corresponding to the friction braking amount, thereby performing friction braking (S26).

However, the braking control process described above has problems as follows.

In the case of the friction braking (hydraulic braking), braking power is directly applied to vehicle wheels using friction. Hence, a difference in braking power is generated according to an environment.

However, in the case of the regenerative braking, braking power is generated using the motor, and hence the regenerative braking is hardly influenced by the environment. Therefore, when the environment is changed, it is impossible to control the addition of braking powers (impossible to satisfy the total braking amount), and the reduction of speed in the vehicle is considerably changed depending on a ratio of the regenerative braking amount not influenced by the environment and the friction braking amount relatively considerably influenced by the environment.

FIGS. 4 and 5 (RELATED ART) are views illustrating problems according to the conventional art. FIG. 4 shows an example of normal regenerative braking cooperation control slightly influenced by an external environment. FIG. 5 shows an example of abnormal regenerative braking cooperation control considerably influenced by the external environment.

As shown in FIG. 4, when the environmental fluctuation amount is not more than a predetermined level, the reliability of friction braking (hydraulic braking) is high, and a total braking command value is equal to an actually performed total braking execution amount. Thus, the braking linearity is high (total braking command value=regenerative braking execution amount+friction braking execution amount=total braking execution amount).

On the other hand, as shown in FIG. 5, when the environmental fluctuation amount is not less than the predetermined level or higher, the reliability of friction braking (hydraulic braking) is relatively low, and the total braking command value is not equal to the actually performed total braking execution amount. Therefore, it is difficult to ensure the braking linearity (total braking command value≠regenerative braking execution amount+friction braking execution amount=total braking execution amount).

As a result, a difference in actual braking deceleration of the vehicle is considerably generated according to external environmental conditions even under the condition of the same driver brake pedal manipulation depth (brake depth).

SUMMARY

The present invention provides a braking control method for an eco-friendly vehicle such as an electric vehicle, a hybrid electric vehicle or a fuel cell electric vehicle, which can solve a problem of change in vehicle deceleration and deceleration feeling due to influence of environmental conditions in performance of vehicle braking through distribution of regenerative braking and friction braking, which satisfy a driver request braking amount in the vehicle, and a problem of deterioration of braking reliability, and ensure the braking linearity of the vehicle even though the environmental conditions are changed.

In one aspect, the present invention provides a braking control method for an eco-friendly vehicle, including: determining a total braking amount according to a driver braking input; determining a regenerative braking permissible amount from the total braking amount through distribution of braking power; determining a regenerative braking torque according to the regenerative braking permissible amount; determining a reference regenerative braking execution amount to which a transmission state is reflected from the regenerative braking torque; determining a final regenerative braking execution amount by correcting the reference regenerative braking execution amount according to environmental information; determining a friction braking amount from the total braking amount and the final regenerative braking execution amount; and performing friction braking for controlling a friction braking device based on the friction braking amount.

Other aspects and exemplary embodiments of the invention are discussed infra.

Accordingly, in the braking control method of the present invention, a regenerative braking execution amount is determined by reflecting environmental conditions such as temperature and humidity, and friction braking (hydraulic braking) is performed by determining a friction braking amount from the regenerative braking execution amount to which the environmental conditions are reflected, thereby solving a problem of change in vehicle deceleration and deceleration feeling due to influence of the environmental conditions and a problem of deterioration of braking reliability, and the like.

Further, it is possible to ensure the braking linearity of the vehicle even though the environmental conditions are changed.

Further, as the accuracy of control is improved, a driver can easily control the braking of the vehicle. As a result, it is possible to enhance the fuel efficiency of the vehicle.

A braking control system for an eco-friendly vehicle can include: a brake controller configured to determine a total braking amount according to a driver braking input, and determine a regenerative braking permissible amount from the total braking amount through distribution of braking power; and a vehicle controller configured to determine a regenerative braking torque according to the regenerative braking permissible amount, determine a reference regenerative braking execution amount to which a transmission state is reflected from the regenerative braking torque, and determine a final regenerative braking execution amount by correcting the reference regenerative braking execution amount according to environmental information, wherein the brake controller further determines a friction braking amount from the total braking amount and the final regenerative braking execution amount, and performs friction braking for controlling a friction braking device based on the friction braking amount.

A non-transitory computer readable medium containing program instructions executed by a processor can include: program instructions that determine a total braking amount according to a driver braking input; program instructions that determine a regenerative braking permissible amount from the total braking amount through distribution of braking power; program instructions that determine a regenerative braking torque according to the regenerative braking permissible amount; program instructions that determine a reference regenerative braking execution amount to which a transmission state is reflected from the regenerative braking torque; program instructions that determine a final regenerative braking execution amount by correcting the reference regenerative braking execution amount according to environmental information; program instructions that determine a friction braking amount from the total braking amount and the final regenerative braking execution amount; and program instructions that perform friction braking for controlling a friction braking device based on the friction braking amount.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
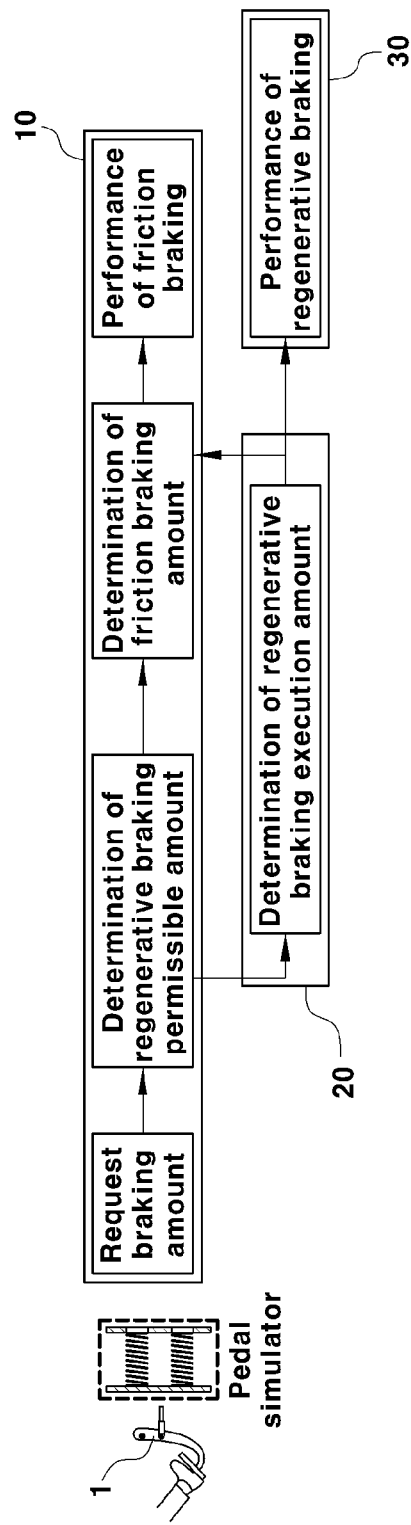
FIG. 1 (RELATED ART) is a schematic view illustrating main functions of controllers in a cooperation control process for braking of in an eco-friendly vehicle according to a conventional art.
Figure 2:
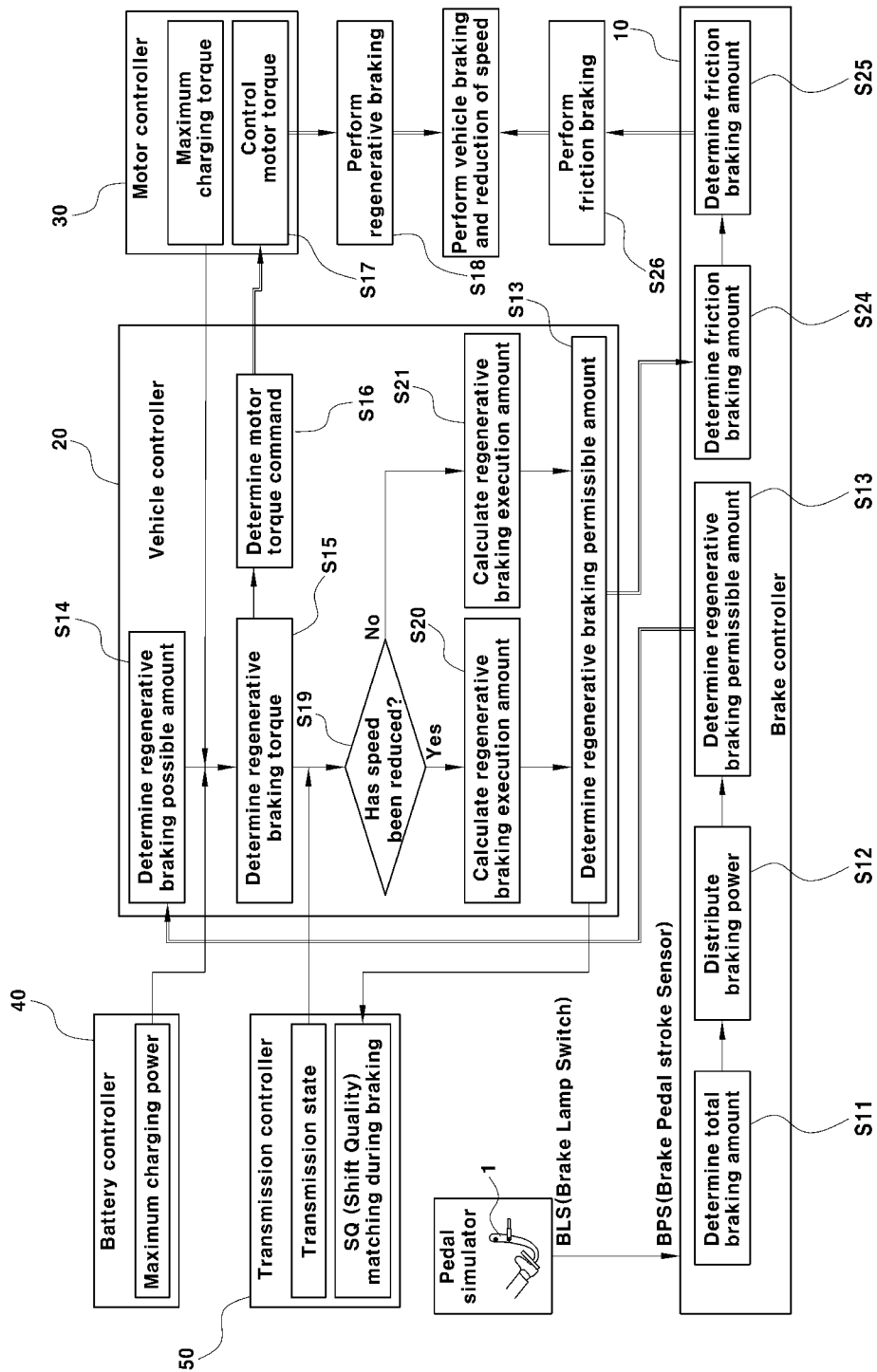
FIGS. 2 and 3 (RELATED ART) are flowcharts illustrating in detail the cooperation control process for braking of the eco-friendly vehicle.
Figure 3:
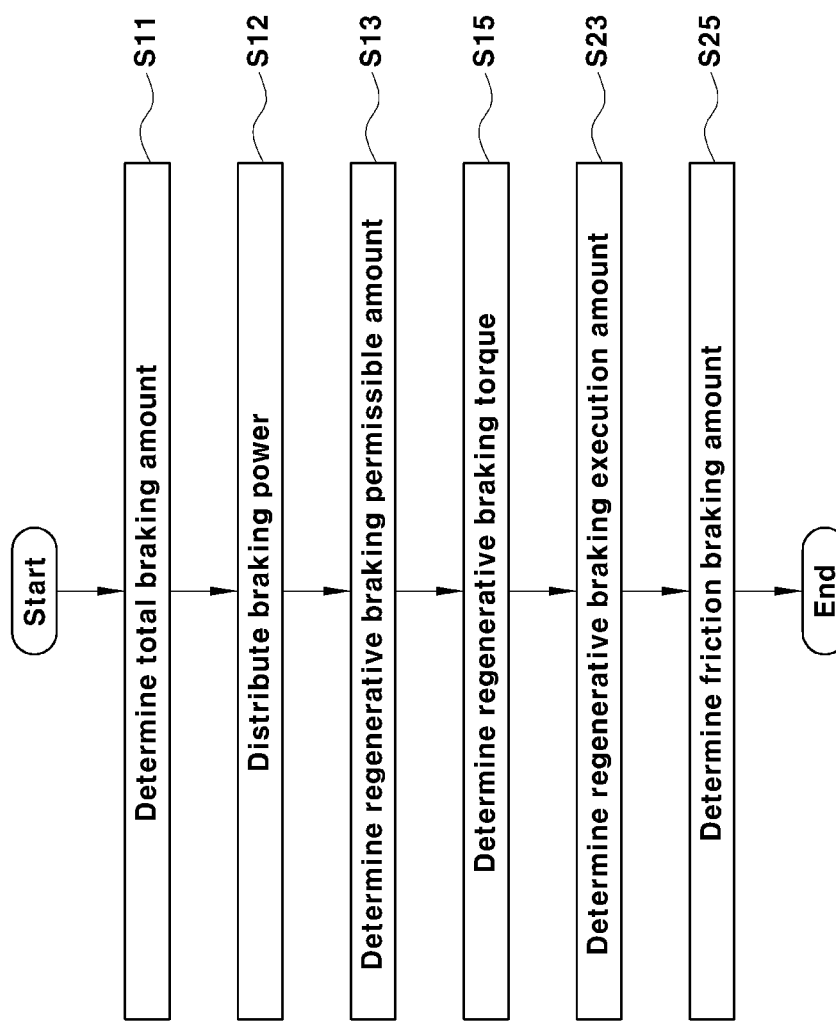
Figure 4:
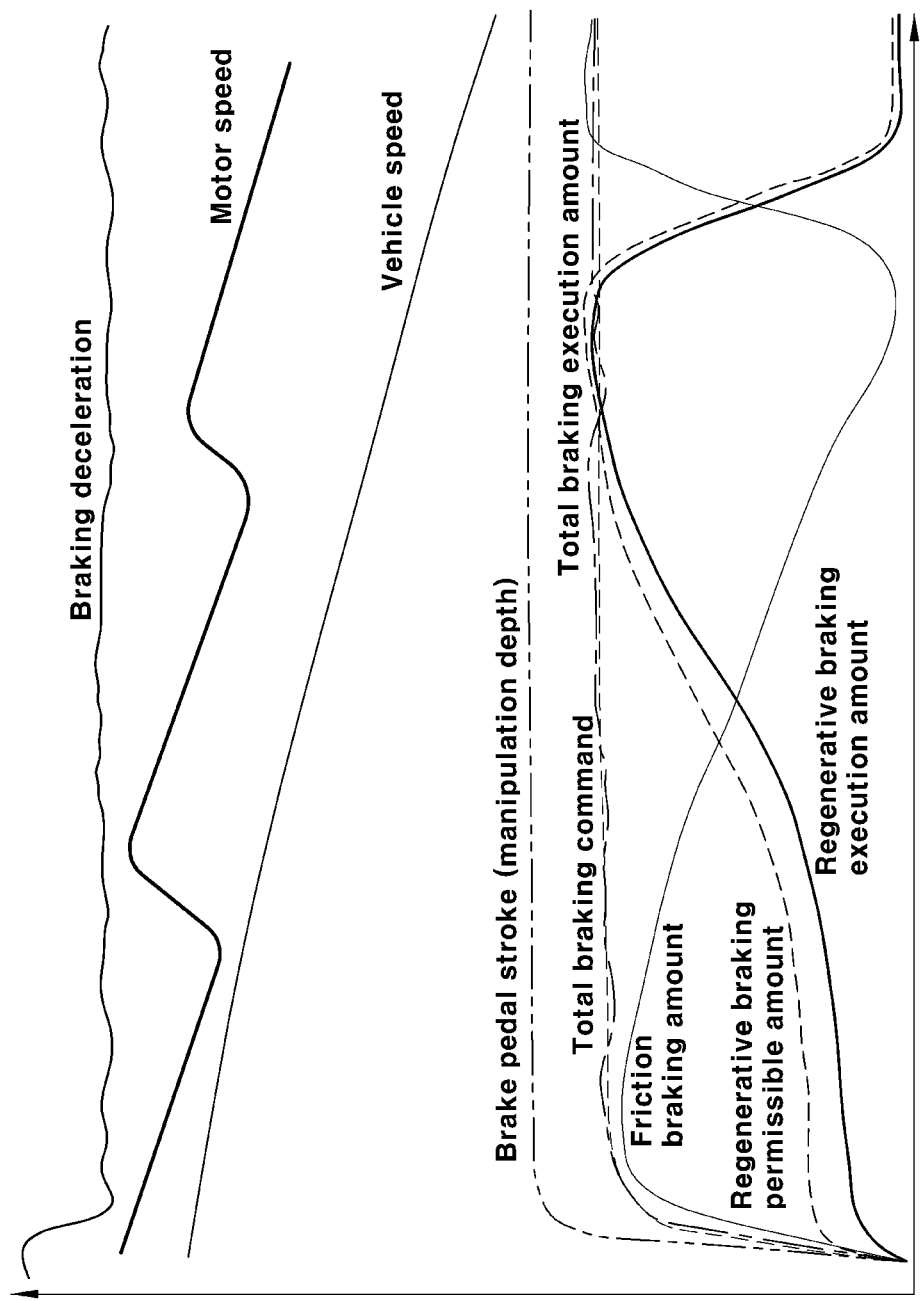
FIGS. 4 and 5 (RELATED ART) are views illustrating problems according to the conventional art.
Figure 5:
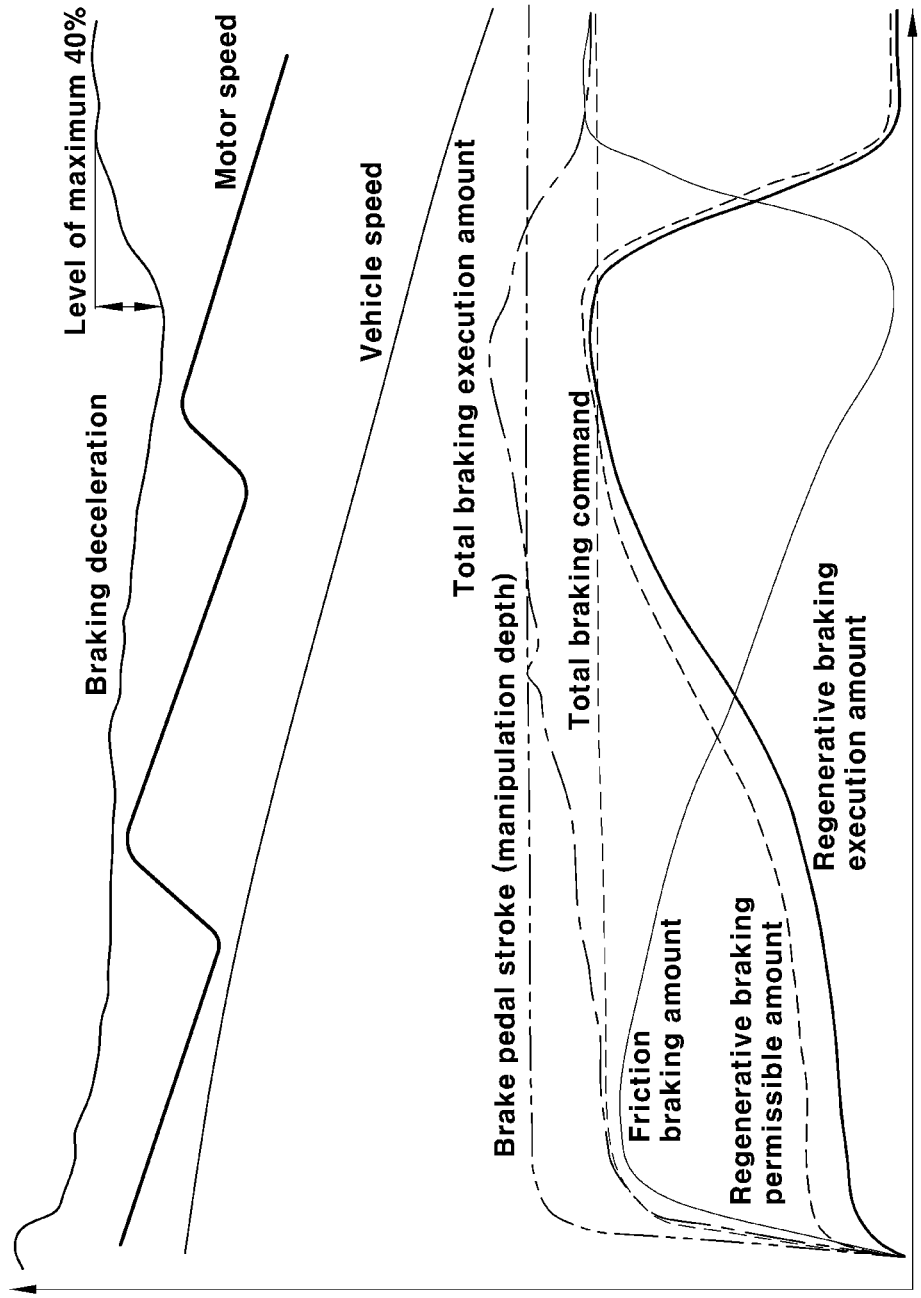

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an " and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present invention provides a braking control method for an eco-friendly vehicle such as an electric vehicle (EV), a hybrid electric vehicle (HEV) or a fuel cell electric vehicle (FCEV), which can solve a problem of change in vehicle deceleration and deceleration feeling due to influence of environmental conditions in performance of vehicle braking through distribution of regenerative braking and friction braking, which satisfy a driver request braking amount in the vehicle, and a problem of deterioration of braking reliability, and ensure the braking linearity of the vehicle even though the environmental conditions are changed.

Figure 6:
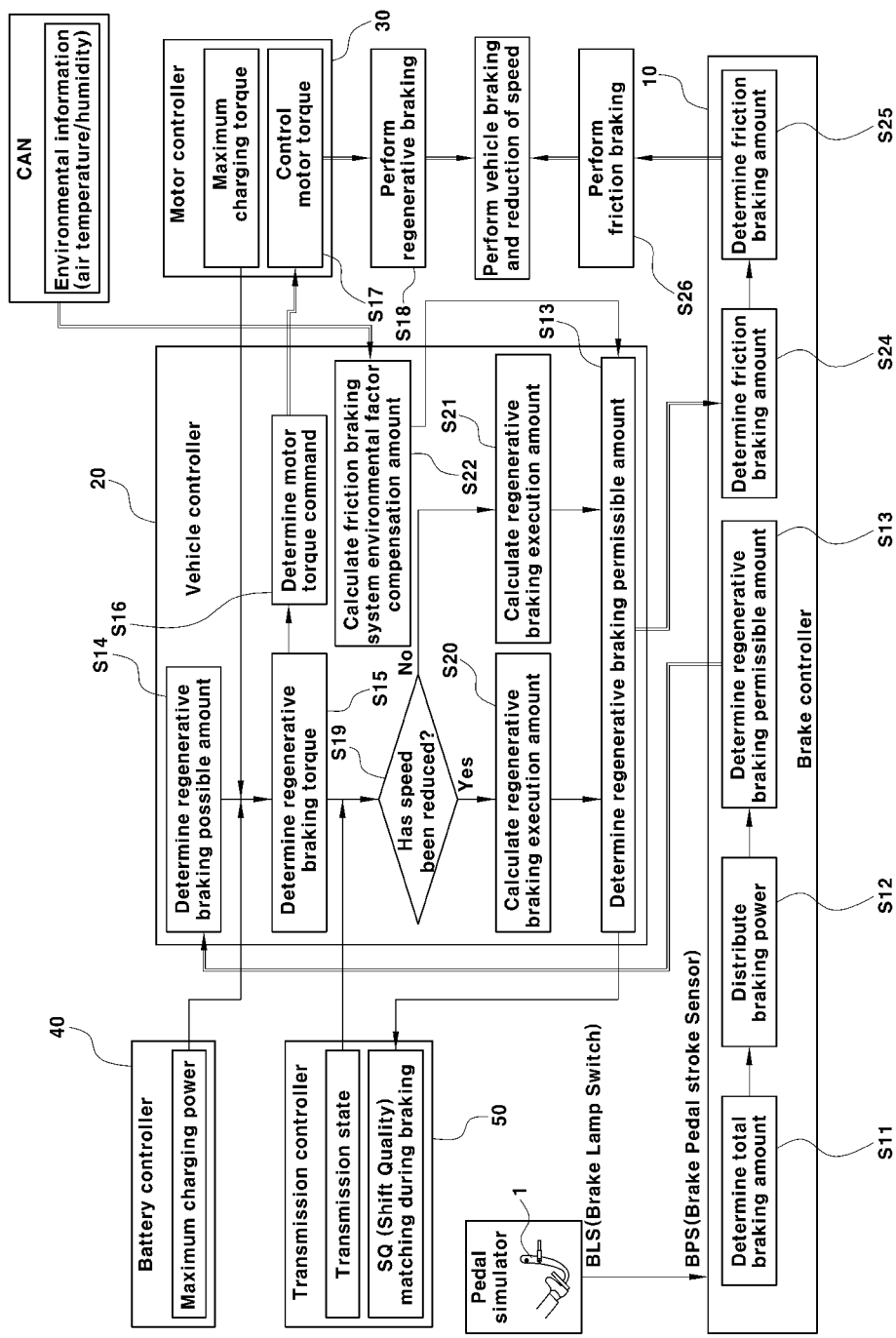
FIGS. 6 and 7 are flowcharts depicting a braking control process of an eco-friendly vehicle according to an embodiment of the present invention.
Figure 7:
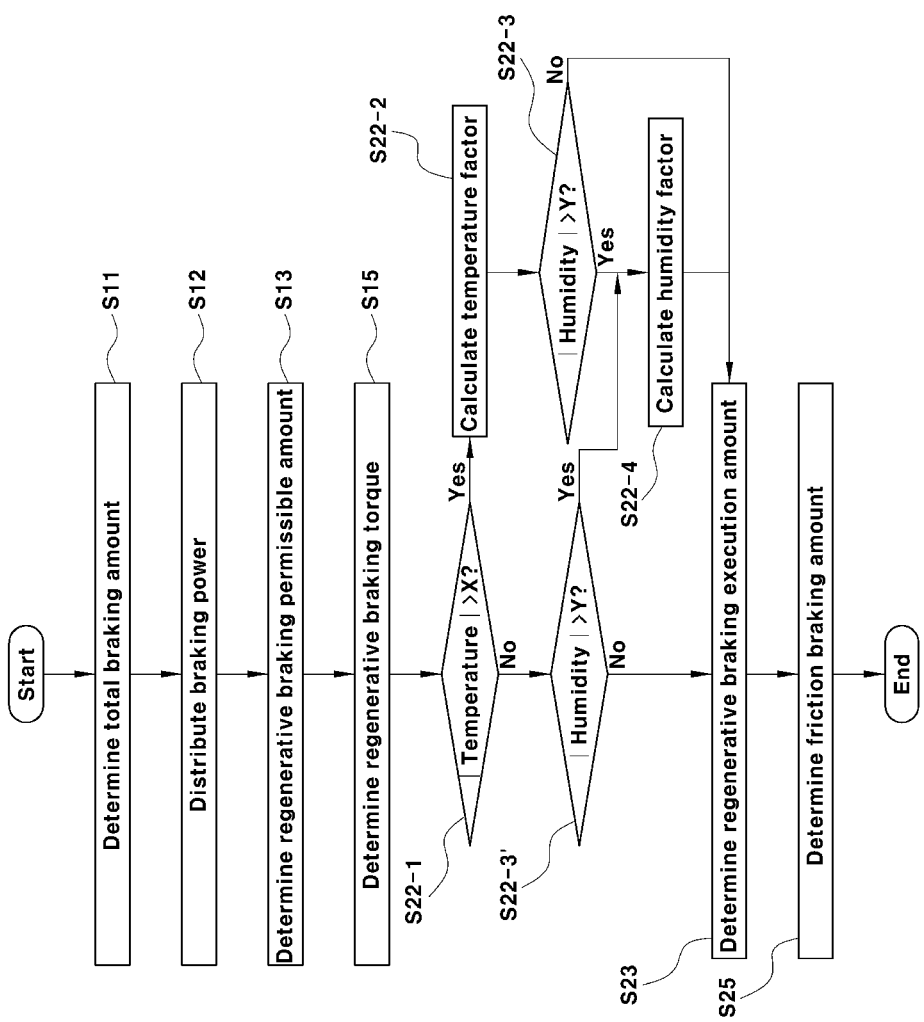

FIGS. 6 and 7 are flowcharts depicting a braking control process of an eco-friendly vehicle according to an embodiment of the present invention.

FIG. 6 illustrates a cooperation control process between controllers for braking of the eco-friendly vehicle. FIG. 7 illustrates a main process of determining a regenerative braking execution amount to which temperature and humidity conditions are reflected from a regenerative braking torque.

First, if a driver manipulates a brake pedal 1, a brake controller 10 determines a total braking amount (S11) according to a pedal stroke (pedal manipulation depth (brake depth)) sensed by a sensor (brake pedal stroke sensor: BPS) (S11), and determines a regenerative braking permissible amount through distribution of braking power (S12 and S13).

The regenerative braking permissible amount is transmitted to a vehicle controller 20. The vehicle controller 20 determines a regenerative braking possible amount according to vehicle conditions (S14) and then determines a regenerative braking torque from the regenerative braking possible amount, using information on the maximum charging power, received in a battery controller 40, and information on the maximum charging torque, received in a motor controller 30 (S15). The vehicle controller 20 determines a motor torque command from the regenerative braking torque (S16) and transmits the determined motor torque command to the motor controller 30.

Accordingly, the motor controller 30 controls the torque of the motor through an inverter according to the motor torque command received from the vehicle controller 20 (S17), thereby performing regenerative braking (S18).

In addition to the performance of the regenerative braking, friction braking is controlled by the brake controller 10. First, the vehicle controller 20 calculates a regenerative braking execution amount according to a change of speed, using information on a state of the transmission, received in a transmission controller 50, from the regenerative braking torque (S19, S20 and S21).

If the regenerative braking execution amount is determined (S23), the vehicle controller 20 transmits the regenerative braking execution amount to the brake controller 10. The brake controller 10 receives the regenerative braking execution amount from the vehicle controller 20 (S24), and determines a friction braking amount obtained by subtracting the regenerative braking execution amount from the total braking amount (S25).

As a result, the brake controller 10 controls a friction braking device to generate braking power corresponding to the friction braking amount, thereby performing friction braking (S26).

The braking control process described above is not different from the conventional braking control process except that correction for the regenerative braking execution amount determined from the regenerative braking torque is additionally performed by reflecting environmental conditions when the regenerative braking execution amount is finally determined.

In the present invention, in the cooperation control process between the controllers for vehicle braking, a regenerative braking execution amount variable logic according to environmental conditions is additionally applied in order to adjust the friction braking (hydraulic braking) amount according to the environmental conditions in the vehicle controller (HCU/VCU).

When control of the friction braking device considerably influenced by the environmental conditions is performed, the friction braking amount is determined by a portion obtained by subtracting a regenerative braking execution amount from a driver request braking amount, i.e., a total braking amount according to a brake pedal manipulation depth (braking input value input by the driver). Thus, when a regenerative braking execution amount to which the environmental conditions are reflected is used in the determination of the friction braking amount, friction braking to which the environmental conditions are reflected can be performed.

Here, the regenerative braking execution amount to which the environmental conditions are reflected may be obtained by correcting, according to the environmental conditions, the existing regenerative braking execution amount obtained from regenerative braking torque and information on a transmission state.

In the present invention, the environmental conditions may be temperature (air temperature), humidity (air humidity), soaking time, and the like. The soaking time means a time taken until the ignition on (IG ON) after the ignition off (IG OFF) of the vehicle.

As such, the vehicle controller 20 calculates a friction braking system environmental factor compensation amount in consideration of air temperature, humidity, soaking time, and the like (S22), and determines a final regenerative braking execution amount to which the environmental conditions are reflected by reflecting the calculated value in the determination of the regenerative braking execution amount (S13).

The brake controller 10 determines a friction braking amount using the regenerative braking execution amount determined as described above (S24), and then controls the friction braking power based on the friction braking amount determined by reflecting the environmental conditions (performance of friction braking through the control of the friction braking device) (S25 and S26).

For reference, characteristics of the friction braking are changed depending on the environmental conditions. In the case of a general internal-combustion engine vehicle, only one friction braking is used as a braking source. Thus, when the environmental conditions are changed, a drive can control the vehicle deceleration and deceleration feeling through learning.

On the other hand, in the case of an eco-friendly vehicle such as an HEV, influences that two braking sources, i.e., sources of regenerative braking and friction braking receive according to the environmental conditions are different from each other. Hence, there may occur a phenomenon that the deceleration feeling is changed depending on a ratio of regenerative braking and friction braking.

Thus, in order to correct a change in deceleration feeling, in the present invention, the friction braking amount is adjusted in such a manner that the influence rate of friction braking and regenerative braking is reflected to the regenerative braking execution amount in consideration of the environmental conditions, thereby ensuring braking linearity.

In the reflection of the influence rate to the regenerative braking execution amount, the vehicle controller (HCU/VCU) receives information on temperature and humidity of the vehicle to perform calculation suitable for the friction braking amount, which is advantageous in terms of degree of accuracy and freedom.

Hereinafter, the method of reflecting the environmental conditions will be described in detail. Among environmental factors having influence on the friction braking, factors having most influence on the friction braking are current temperature and current humidity.

Therefore, sensing means for acquiring environmental information, i.e., a temperature sensor for detecting temperature (air temperature) and a humidity sensor for detecting humidity (air humidity) may be used, and the vehicle controller can acquire information on temperature and humidity, detected by the two sensors.

In this state, the vehicle controller evaluates a temperature factor from a temperature that becomes a reference and a current temperature detected by the temperature sensor, and calculates a humidity factor from a humidity that becomes a reference and a current humidity detected by the humidity sensor.

Here, the temperature that becomes the reference and the humidity that becomes the reference, i.e., the reference temperature and the reference humidity are values previously input and set in the vehicle controller. The temperature factor ($factor_T$) and the humidity factor ($factor_H$) may be calculated as shown in the following equations.

$$factor_T = 1 + \frac{\text{current temperature} - \text{reference temperature}}{\text{reference temperature}} \times factor_1$$

$$factor_H = 1 + \frac{\text{current humidity} - \text{reference humidity}}{\text{reference humidity}} \times factor_2$$

Here, $factor_1$ and $factor_2$ are already determined reference vector values.

As a result, in step S22 of FIG. 6, the temperature factor and the humidity factor according to the environmental conditions are calculated as the friction braking system environmental factor compensation amount, and each factor is used to determine the final regenerative braking execution amount where the environmental conditions are considered in step S23.

In particular, if a reference regenerative braking execution amount according to a transmission state is evaluated from the regenerative braking torque determined in step S15 via steps S19, S20 and S21, the reference regenerative braking execution amount is corrected according to the environmental conditions. In this state, a final regenerative braking execution amount is determined by reflecting, to the reference regenerative braking execution amount, each factor (friction braking system environmental factor compensation amount) according to the environmental conditions.

Regenerative braking execution amount_reflection of environmental conditions=reference regenerative braking execution amount×$factor_1$×$factor_2$ If the final regenerative braking execution amount to which the environmental conditions are reflected as described above is determined, a friction braking amount is evaluated using the value obtained by subtracting the final regenerative braking execution amount from the total braking amount, and the friction braking device is controlled to generate braking power corresponding to the friction braking amount, thereby performing friction braking.

As described above, in the present invention, the friction braking amount is adjusted by reflecting factors according to the environmental conditions to the existing regenerative braking execution amount evaluated based on the regenerative braking torque, i.e., the reference regenerative execution amount.

In a preferred embodiment, the friction braking system environmental factor compensation described above, i.e., the process of compensating the reference regenerative execution amount according to the environmental conditions may be set to be performed under a predetermined environmental condition.

In particular, the friction braking system environmental factor compensation is performed only when the temperature is beyond a predetermined setting temperature range or when the humidity is beyond a predetermined setting humidity range.

This will be described with reference to FIG. 7. The brake controller determines a total braking amount according to a driver braking input value (brake pedal manipulation depth) (S11), and then determines a regenerative braking permissible amount through distribution of braking power (S12 and S13).

Subsequently, the vehicle controller determines a regenerative braking torque from the regenerative braking permissible amount (S15), and identifies whether the temperature (air temperature) and humidity (air humidity), detected by the sensors, are beyond the setting ranges, respectively, thereby performing a process of calculating a friction braking system environmental factor compensation amount.

If at least one of the temperature and humidity is beyond the setting range in steps S22-1 and S22-3' of FIG. 7, i.e., if only the current temperature is beyond the setting temperature range in step S22-1, only a temperature factor is evaluated (S22-2). If only the current humidity is beyond the setting humidity range in step S22-3', only a humidity factor is evaluated (S22-3). If both the current temperature and the current humidity are beyond the setting temperature range and the setting humidity range, respectively, both the temperature factor and the humidity factor are evaluated (S22-2 and S22-4).

Subsequently, the regenerative braking execution amount is corrected by multiplying the reference regenerative braking execution amount evaluated according to the information on the transmission state from the regenerative braking torque by the evaluated factor.

Accordingly, if the vehicle controller determines a final regenerative braking execution amount to which the environmental conditions are reflected (S23), the brake controller determines a friction braking amount from the total braking amount and the final regenerative braking execution amount (S25), and then controls the friction braking device based on the determined friction braking amount.

As described above, in the present invention, the friction braking amount is adjusted based on environmental information, so that it is possible to solve a problem of change in vehicle deceleration and deceleration feeling due to influence of environmental conditions, and a problem of deterioration of braking reliability. Further, it is possible to ensure the braking linearity of the vehicle even when the environmental conditions are changed.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A braking control method for an eco-friendly vehicle, comprising the steps of:
   determining, by a brake controller, a total braking amount according to a driver braking input;
   determining, by the brake controller, a regenerative braking permissible amount from the total braking amount through distribution of braking power;
   determining, by a vehicle controller, a regenerative braking torque according to the regenerative braking permissible amount;
   determining, by the vehicle controller, a reference regenerative braking execution amount to which a transmission state is reflected from the regenerative braking torque;
   determining, by the vehicle controller, a final regenerative braking execution amount by correcting the reference regenerative braking execution amount according to environmental information;
   determining, by the brake controller, a friction braking amount from the total braking amount and the final regenerative braking execution amount; and
   performing, by the brake controller, friction braking for controlling a friction braking device based on the friction braking amount.

2. The braking control method of claim 1, wherein the environmental information includes air temperature and air humidity.

3. The braking control method of claim 2, wherein, in the step of determining the final regenerative braking execution amount, at least one of a temperature factor corresponding to the current temperature and a humidity factor corresponding to the current humidity is calculated, and the final regenerative braking execution amount is determined using the value obtained by multiplying the reference regenerative braking execution amount by the calculated factor.

4. The braking control method of claim 3, wherein the temperature factor is calculated from the current temperature and a previously set reference temperature by the following Equation (1):

$$factor_T = 1 + \frac{current\ temperature - reference\ temperature}{reference\ temperature} \times factor_1, \quad \text{Equation (1)}$$

wherein $factor_T$ is a temperature factor, and $factor_1$ is a previously set reference factor.

5. The braking control method of claim 3, wherein the humidity factor is calculated from the current humidity and a previously set reference humidity by the following Equation (2):

$$factor_H = 1 + \frac{current\ humidity - reference\ humidity}{reference\ humidity} \times factor_2, \quad \text{Equation (2)}$$

wherein $factor_H$ is a humidity factor, and $factor_2$ is a previously set reference factor.

6. The braking control method of claim 3, wherein, in the calculation of the at least one of a temperature factor and a humidity factor according to environmental conditions, when only the current temperature is beyond a predetermined setting temperature range, only the temperature factor is evaluated,
   wherein, when only the current humidity is beyond a predetermined setting humidity range, only the humidity factor is evaluated,
   wherein, when both the current temperature and the current humidity are beyond the predetermined setting temperature range and the predetermined setting humidity range, respectively, both the temperature factor and the humidity factor are evaluated, and
   wherein the evaluated factors are used to correct the reference regenerative braking execution amount.

7. A braking control system for an eco-friendly vehicle, comprising:
   a brake controller configured to determine a total braking amount according to a driver braking input, and determine a regenerative braking permissible amount from the total braking amount through distribution of braking power; and
   a vehicle controller configured to determine a regenerative braking torque according to the regenerative braking permissible amount, determine a reference regenerative braking execution amount to which a transmission state is reflected from the regenerative braking torque, and determine a final regenerative braking execution amount by correcting the reference regenerative braking execution amount according to environmental information,
   wherein the brake controller further determines a friction braking amount from the total braking amount and the final regenerative braking execution amount, and performs friction braking for controlling a friction braking device based on the friction braking amount.

8. The braking control system of claim 7, wherein the environmental information includes air temperature and air humidity.

9. The braking control system of claim 8, wherein, in determining the final regenerative braking execution amount, at least one of a temperature factor corresponding to the current temperature and a humidity factor corresponding to the current humidity is calculated, and the final regenerative braking execution amount is determined using the value obtained by multiplying the reference regenerative braking execution amount by the calculated factor.

10. A non-transitory computer readable medium containing program instructions executed by a processor, the computer readable medium comprising:
- program instructions that determine a total braking amount according to a driver braking input;
- program instructions that determine a regenerative braking permissible amount from the total braking amount through distribution of braking power;
- program instructions that determine a regenerative braking torque according to the regenerative braking permissible amount;
- program instructions that determine a reference regenerative braking execution amount to which a transmission state is reflected from the regenerative braking torque;
- program instructions that determine a final regenerative braking execution amount by correcting the reference regenerative braking execution amount according to environmental information;
- program instructions that determine a friction braking amount from the total braking amount and the final regenerative braking execution amount; and
- program instructions that perform friction braking for controlling a friction braking device based on the friction braking amount.

11. The non-transitory computer readable medium of claim 10, wherein the environmental information includes air temperature and air humidity.

12. The non-transitory computer readable medium of claim 11, wherein, in determining the final regenerative braking execution amount, at least one of a temperature factor corresponding to the current temperature and a humidity factor corresponding to the current humidity is calculated, and the final regenerative braking execution amount is determined using the value obtained by multiplying the reference regenerative braking execution amount by the calculated factor.

* * * * *